United States Patent
Alefelder et al.

(10) Patent No.: US 9,425,587 B2
(45) Date of Patent: Aug. 23, 2016

(54) BUSBARS HAVING DIFFERENT CROSS SECTIONS FOR A BUSBAR SYSTEM WITH A COMMON PROTECTION OR NEUTRAL CONDUCTOR

(71) Applicant: Siemens Aktiengesellschaft, Munich (DE)

(72) Inventors: Frank Alefelder, Neunkirchen-Seelscheid (DE); Frank Bertels, Cologne (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/391,815

(22) PCT Filed: Feb. 14, 2013

(86) PCT No.: PCT/EP2013/052973
§ 371 (c)(1),
(2) Date: Oct. 10, 2014

(87) PCT Pub. No.: WO2013/152881
PCT Pub. Date: Oct. 17, 2013

(65) Prior Publication Data
US 2015/0077906 A1 Mar. 19, 2015

(30) Foreign Application Priority Data
Apr. 12, 2012 (DE) .......................... 10 2012 205 987

(51) Int. Cl.
*H02B 1/20* (2006.01)
*H02B 1/56* (2006.01)
(Continued)

(52) U.S. Cl.
CPC ............ *H02B 1/202* (2013.01); *F03D 11/0066* (2013.01); *H02B 1/565* (2013.01); *H02G 5/025* (2013.01); *H02G 5/007* (2013.01); *H02G 5/06* (2013.01); *Y02E 10/722* (2013.01)

(58) Field of Classification Search
CPC .............. H05K 1/02; H02B 1/20; H02B 5/02; H02B 5/06; H02B 5/10; H02B 5/007; H02B 1/04; H02B 1/26; H02B 1/202; H02B 1/565; H02B 3/04; H02B 3/06; H01R 4/60; H01R 31/06
USPC ......... 361/605, 611–615, 637, 638, 648, 650, 361/639, 649; 174/16.2, 88 B, 68.2, 68.3, 174/71 B, 72 B, 99 B, 117 R, 149 R, 70 B, 174/133 B, 129 B; 439/527, 212, 213, 214
See application file for complete search history.

(56) References Cited

U.S. PATENT DOCUMENTS 2,648,032 A * 8/1953 Mekelburg ............... H02B 1/21
312/107.5
2,824,901 A * 2/1958 Reichert .................. H02G 5/06
174/129 B (Continued)

FOREIGN PATENT DOCUMENTS

DE 1941833 B1 2/1971
DE 003437586 A1 * 4/1986 ............... H02G 5/08

(Continued)

OTHER PUBLICATIONS

International Search Report PCT/ISA/210 for International Application No. PCT/EP2013/052973 Dated May 3, 2013.

(Continued)

*Primary Examiner* — Michail V Datskovskiy
(74) *Attorney, Agent, or Firm* — Harness, Dickey & Pierce, P.L.C.

(57) ABSTRACT

An embodiment of the invention relates to busbars having different cross sections for a busbar system with a common protection and/or neutral conductor for the transport of electrical energy. The busbar system includes at least one first segment and a second segment, the segments having each at least one first busbar with a first cross-sectional area, at least a second busbar with a second cross-sectional area, a holding element and at least one connection. According to an embodiment of the invention, the busbars of the segments are held by the respective holding element and are electrically connected to each other via the at least one connection, and a busbar from either the first busbars or second busbars serves as a common protection conductor and/or as a common neutral conductor.

19 Claims, 4 Drawing Sheets

(51) Int. Cl.
*H02G 5/02* (2006.01)
*F03D 11/00* (2006.01)
*H02G 5/00* (2006.01)
*H02G 5/06* (2006.01)

(56) References Cited

U.S. PATENT DOCUMENTS

| | | | | |
|---|---|---|---|---|
| 3,178,668 | A * | 4/1965 | Weimer | H02G 5/06 174/88 B |
| 3,180,924 | A * | 4/1965 | Rowe | H02G 5/007 174/88 B |
| 3,462,541 | A * | 8/1969 | Wescott | H02G 5/007 174/88 B |
| 4,901,200 | A | 2/1990 | Mazura | |
| 5,486,651 | A * | 1/1996 | Morgan | H02G 5/007 174/129 B |
| 7,286,337 | B2 | 10/2007 | Masuhara et al. | |
| 7,511,946 | B2 * | 3/2009 | Malkowski, Jr. | H02B 1/21 174/174 |
| 8,134,070 | B2 * | 3/2012 | Hirschfeld | H02B 1/20 174/133 B |
| 8,257,156 | B2 | 9/2012 | Shabany et al. | |
| 8,462,495 | B1 | 6/2013 | Keefe et al. | |
| 8,649,176 | B2 | 2/2014 | Okada et al. | |
| 8,791,361 | B2 | 7/2014 | Gingrich | |
| 8,837,116 | B2 | 9/2014 | Eichler et al. | |
| 2002/0159232 | A1 | 10/2002 | Beitelmal et al. | |
| 2005/0042099 | A1 | 2/2005 | Wobben | |
| 2005/0068722 | A1 | 3/2005 | Wei | |
| 2006/0225379 | A1 | 10/2006 | Seidel et al. | |
| 2010/0012375 | A1 * | 1/2010 | Jur | H02G 5/007 174/88 B |
| 2011/0140446 | A1 | 6/2011 | Knoop | |
| 2011/0221205 | A1 | 9/2011 | Haar et al. | |
| 2012/0306213 | A1 | 12/2012 | Hubbers et al. | |

FOREIGN PATENT DOCUMENTS

| | | | |
|---|---|---|---|
| DE | 690 26 161 T2 | 11/1996 | |
| DE | 102008018790 A1 | 10/2009 | |
| DE | 102008058129 A1 | 5/2010 | |
| DE | 102012202435 A1 | 8/2013 | |
| EP | 0 413 242 A2 | 8/1990 | |
| EP | 001246332 A2 * | 10/2002 | H02B 1/20 |
| EP | 2081269 A1 | 7/2009 | |
| JP | H08028534 | 2/1996 | |
| KR | 20040045862 A | 6/2004 | |
| KR | 20040045862 A | 8/2004 | |
| WO | WO-9953582 A1 | 10/1999 | |

OTHER PUBLICATIONS

Written Opinion of the International Searching Authority PCT/ISA/237 for International Application No. PCT/EP2013/052973 dated May 3, 2013.
Korean Office Action mailed Nov. 19, 2015.
Office Action mailed Feb. 2, 2016 in corresponding U.S. Appl. No. 14/391,801.
Korean Notice of Allowance mailed May 2, 2016.

* cited by examiner

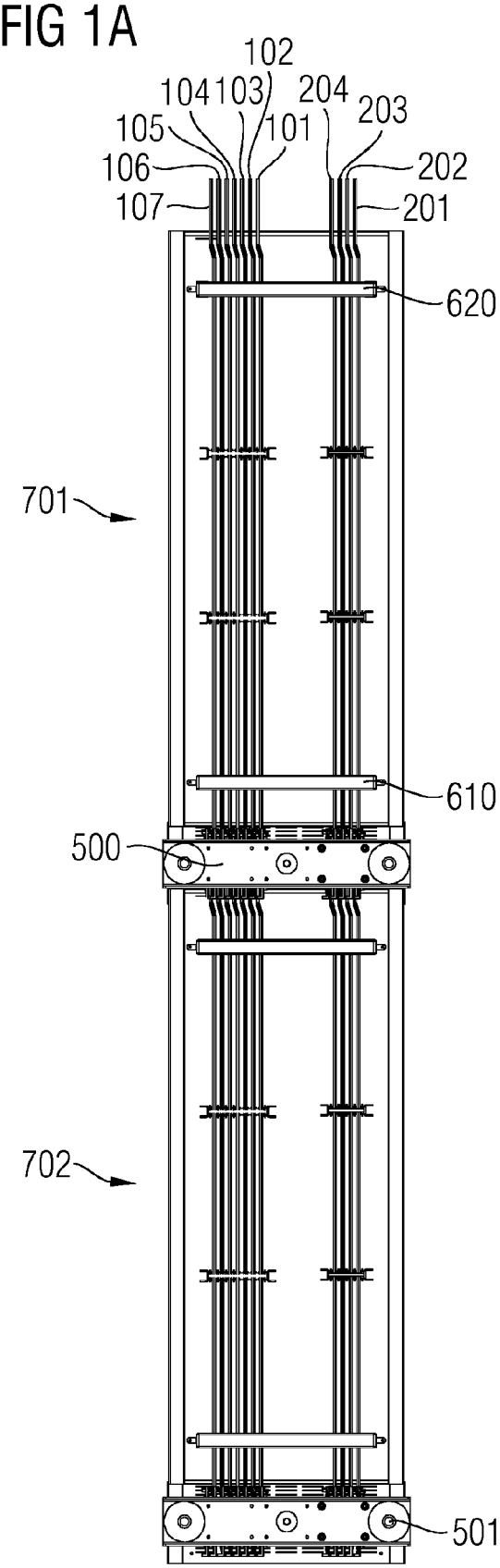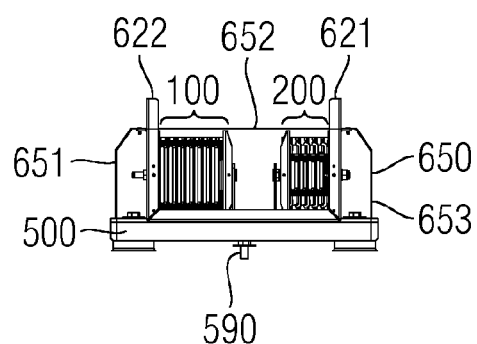

BUSBARS HAVING DIFFERENT CROSS SECTIONS FOR A BUSBAR SYSTEM WITH A COMMON PROTECTION OR NEUTRAL CONDUCTOR

PRIORITY STATEMENT

This application is the national phase under 35 U.S.C. §371 of PCT International Application No. PCT/EP2013/052973 which has an International filing date of Feb. 14, 2013, which designated the United States of America, and which claims priority to German patent application number DE 102012205987.3 filed Apr. 12, 2012, the entire contents of each of which are hereby incorporated herein by reference.

BACKGROUND

Electrical distribution systems can be designed as busbar systems. Busbar systems are used to transport and distribute electrical energy. A busbar system is typically responsible for the connection from a transformer via a main distribution frame to the subsidiary distribution frame, or for the supply to bulk consumers, for example. Busbar systems are likewise used in wind power plants to conduct the current produced by a generator in the head of the tower to the foot of the tower. The busbars of a busbar system are typically housed in a busway section which prevents the occurrence of any undesired electrical contact between busbars and the environment. In this case, the busway section is so dimensioned as to provide the clearances which prevent any undesired electrical contact, and to cool the busbars within the busway section by natural or forced convection.

The housings of conventional busbar systems form a functional unit together with the busbars, thereby placing restrictions on the dimensioning of the busbar elements and on the ventilation of the system. When transporting energy over long vertical distances in particular, e.g. in high-rise buildings or in wind power plants, the limited ventilation and/or convection within the busway sections result in an accumulation of heat in the upper region of the installed busbar systems.

10 2012 202 435 DE proposes a busbar system which can comprise a plurality of busbars of different types. For example, the busbar system disclosed in 10 2012 202 435 DE may be composed of two busbar types having different cross-sectional areas and a different number of busbars of the individual types. Existing busbar systems typically comprise a suitable type of protective conductor (PE) and/or neutral conductor

SUMMARY

An embodiment of the invention provides a busbar system wherein the housing of the busbar system is functionally separate from the current-carrying elements and wherein the protective conductor (PE) and/or the neutral conductor is arranged in a particularly effective manner.

The busbar system of an embodiment for transporting electrical energy comprises at least one first segment and one second segment, the segments each comprising at least one first busbar having a first cross-sectional area, at least one second busbar having a second cross-sectional area, a retaining unit and at least one connection, wherein the busbars of the segments are retained by the respective retaining units and electrically interconnected via the at least one connection, and wherein a busbar from either the first busbars or the second busbars is used as a shared protective conductor (PE) and/or as a shared neutral conductor.

It is advantageous here that the size of the busbars can be adapted as required, since their dimensioning is not limited by a system housing. Likewise, a better thermal lift can be generated in the housing as a result of increasing the clearances of busbars from a potential housing. By virtue of this effect, the heat dissipation improves and the current carrying capacity of the busbars is increased. If a busbar from either the first busbars or the second busbars is used as a shared protective conductor (PE) and/or as a shared neutral conductor, this saves weight and material. The busbar system can therefore be produced more economically.

In one embodiment, the busbars of the segments are so designed as to extend in the direction of the current flow.

In a further embodiment, the segments comprise a plurality of first busbars and/or a plurality of second busbars, said busbars being so arranged as to be parallel with each other in the respective segment.

In one embodiment, the retaining units comprise a first bolt-type connection, wherein the first busbars of the respective segments are electrically interconnected in that the ends of the first busbars lie flat against each other and the first bolt-type connection exerts a force which presses the ends of the first busbars together, said ends lying flat against each other.

In a further embodiment, the retaining units comprise a second bolt-type connection, wherein the second busbars of the respective segments are electrically interconnected in that the ends of the second busbars lie flat against each other and the second bolt-type connection exerts a force which presses the ends of the second busbars together, said ends lying flat against each other.

The retaining units of the segments can be used as retaining device(s) for fastening the busbar system.

In one embodiment, the first cross-sectional area of the first busbars differs from the second cross-sectional area of the second busbars. The first cross-sectional area of the first busbars may differ from the second cross-sectional area of the second busbars because the height of the first busbars differs from that of the second busbars.

The first busbars and the second busbars can run parallel with each other.

In a further embodiment, the first busbars and the second busbars of the respective segments are interconnected by a single bolt-type connection in each case.

In a further embodiment, retainers are attached to the busbars of the respective segments and a cover is fastened to said retainers. The housing or the busway section is therefore attached to the busbars themselves using as few components as possible.

In a further embodiment of the invention, the cover is only attached to those sides of the segments which face away from the fastening of the busbar system.

In a further embodiment of the invention, the busbar system comprising first busbars and second busbars also comprises an adapter which can connect the first busbars to a first external busbar system and the second busbars to a second external busbar system.

The adapter can be so designed as to connect the busbar that is used as a shared protective conductor (PE) and/or as a shared neutral conductor to the protective conductor (PE) and/or the neutral conductor of the first external busbar system and to the protective conductor (PE) and/or the neutral conductor of the second external busbar system.

Moreover, the adapter can be so designed as to provide a right-angled connection between the first and second busbars on one side, these running parallel with each other, and the busbars of the first and second external busbar systems on the other side.

BRIEF DESCRIPTION OF THE DRAWINGS

The invention is described below with reference to the following embodiments and figures, in which:

FIG. 1A shows a busbar system comprising a first segment and a second segment illustrated in a first projection, FIG. 1B shows a segment of a busbar system with first busbars and second busbars illustrated in a second projection.

DETAILED DESCRIPTION OF THE EXAMPLE EMBODIMENTS

Figure 2A:
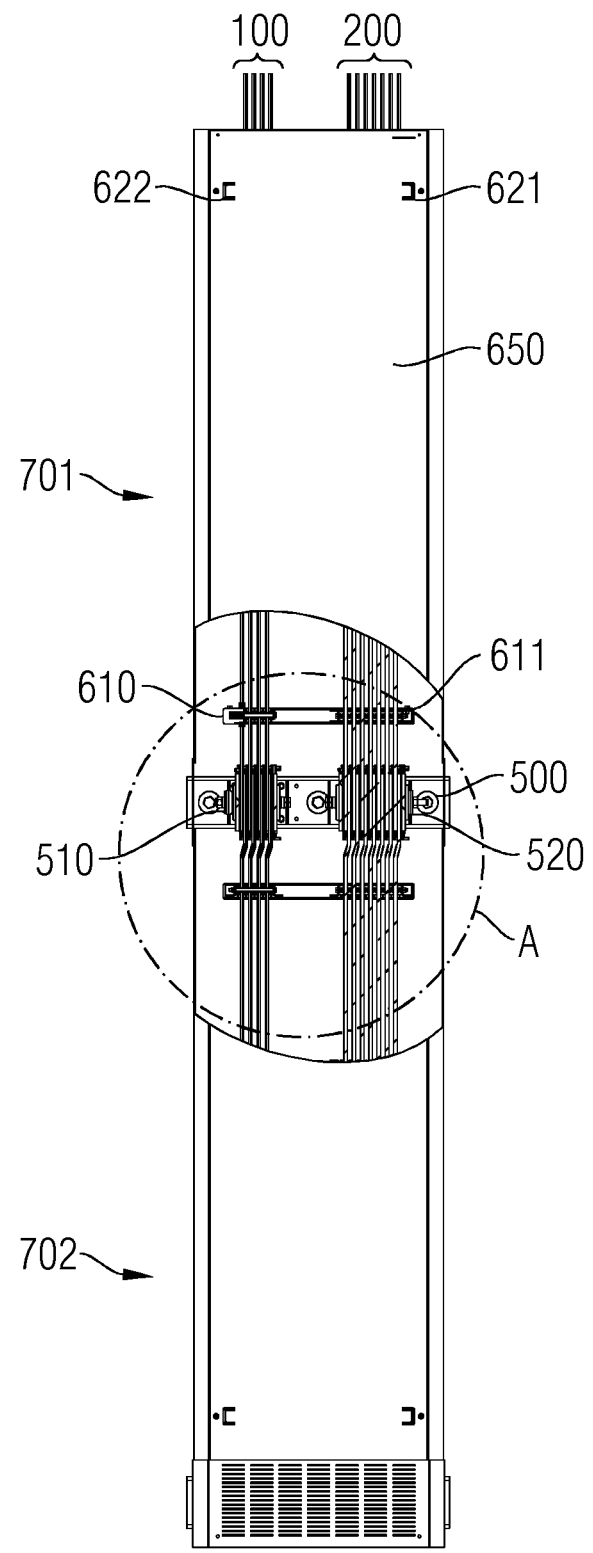
FIG. 2A shows a busbar system comprising a first segment and a second segment with a cover.

FIG. 1A shows a busbar system for transporting electrical energy, illustrated in a first projection of the top view of the busbar system. The busbar system comprises a first segment 701 and a second segment 702. The segments 701, 702 each comprise first busbars 101, 102, 103, 104, 105, 106, 107 having a first cross-sectional area and a retaining unit 500, 501, the busbars of the respective segments 701, 702 being retained by the respective retaining units 500, 501 and electrically interconnected via a connection 510, 520. According to FIG. 1A, the retaining unit 500 is assigned to the first segment 701 and retaining unit 501 to the second segment 702. The connection 510, 520 connects the respective first busbars 101, 102, 103, 104, 105, 106, 107 of the first and second segments.

The busbars of the busbar system according to an embodiment of the invention are so designed as to extend in the direction of the current flow. According to the illustration in FIG. 1A, this means that the current flow runs vertically and therefore the busbars are likewise so configured as to extend vertically. The individual first busbars 101, 102, 103, 104 of the respective segments 701, 702 are so arranged as to be parallel with each other.

FIG. 1B shows the busbar system according to an embodiment of the invention, illustrated in a second projection. In comparison with FIG. 1A, the illustration in FIG. 1B is perpendicular relative to the current flow. The retaining unit 500 retains the first busbars 100 and also has a fastening device 590 which is used as a retaining device for fastening the busbar system. The fastening device 590 may take the form of a screw, for example, such that the segments can be fastened to a wall or a support by way of the screws 590.

As shown in FIG. 1A, the segment 710 also has retainers 610, 620 which are attached directly to the busbars. A cover 650 may be fastened to the retainers 610, 620 as illustrated in FIG. 2A. The retainers 610, 620 may have arms 621, 622, which extend perpendicularly relative to the alignment of the busbars and which support the cover 650. In this case, the arms 621, 622 of the retainers 610, 620 can reach through openings in the cover 650 and fix the latter thereby. In order to prevent the cover 650 from coming loose, it may be fixed by way of screws, rivets or other fastening device after the cover 650 has been placed on the busbar system.

Figure 2B:
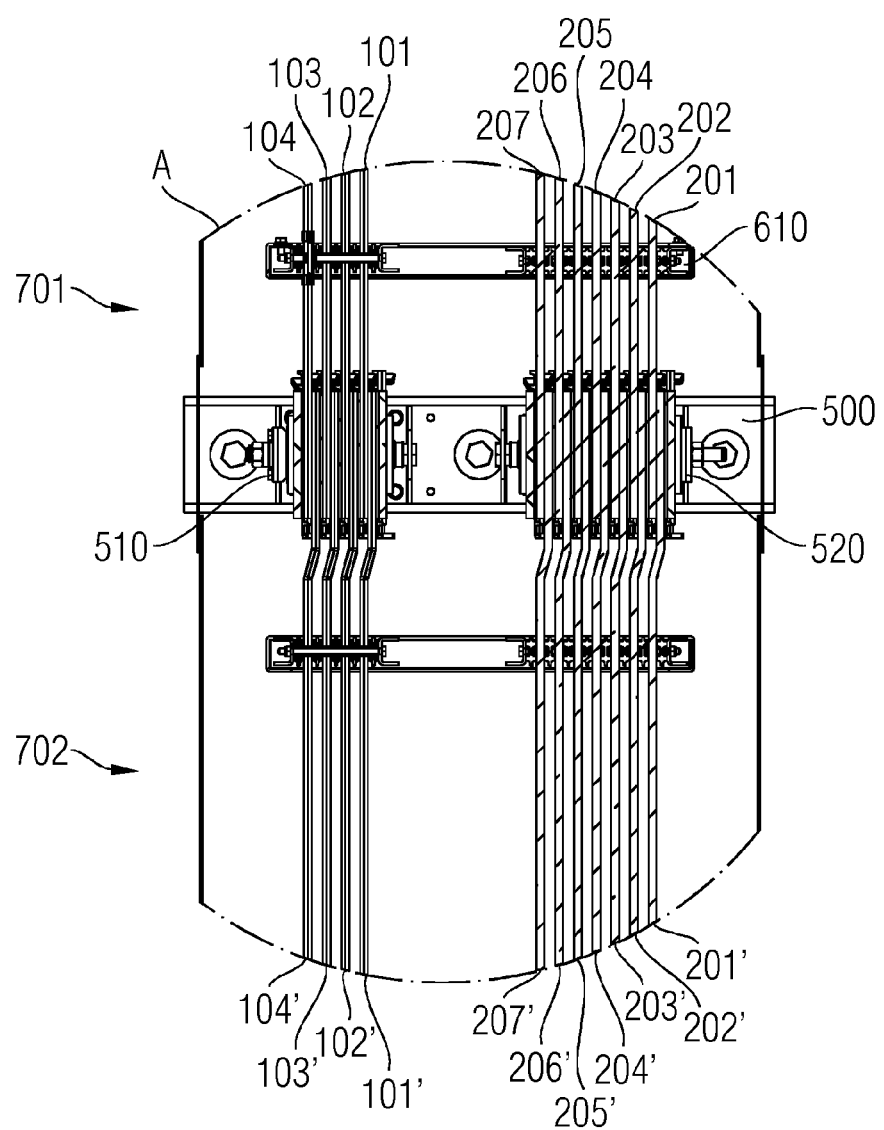
FIG. 2B shows a detailed view of a retaining unit with a first and a second bolt-type connection.

The retaining unit 500 is illustrated in greater detail in FIG. 2B. The retaining unit 500 connects the first segment 701 to the second segment 702. The first segment 701 comprises first busbars 101, 102, 103, 104. The second segment 702 comprises first busbars 101', 102', 103', 104'. The first busbars of the segments 701, 702 are electrically interconnected in that the ends of the first busbars lie flat against each other and a first bolt-type connection 510 exerts a force which presses the ends of the first busbars together, said ends lying flat against each other. The ends of the first busbars of the respective segments 701, 702 may be designed in the form of a hook on one side and feature a hole on the other side, through which the bolt-type connection of the retaining unit 500, 501 passes. This choice of structure for the ends of the first busbars allows the segments 701, 702 to be assembled with particular ease. After assembly of the retaining units 500, 501, the hooks can be swiveled into the bolt-type connection and the bolt-type connection tightened.

The first segment 701 also comprises second busbars 201, 202, 203, 204, 205, 206, 207 having a second cross-sectional area, which may differ from the first cross-sectional area of the first busbars 101, 102, 103, 104. FIG. 1B illustrates the different cross-sectional areas of the first busbars 100 and second busbars 200. The second busbars likewise run parallel with each other in the respective segments 701, 702. According to the FIGS. 1A, 2A and 2B, the first busbars 101, 102, 103, 104 and the second busbars 201, 202, 203, 204, 205, 206, 207 run parallel with each other.

The first cross-sectional area of the first busbars 101, 102, 103, 104 differs from the second cross-sectional area of the second busbars 201, 202, 203, 204, 205, 206, 207 because the height of the first busbars 101, 102, 103, 104 differs from that of the second busbars 201, 202, 203, 204, 205, 206, 207.

The busbar 204 from the second busbars 201, 202, 203, 204, 205, 206, 207 is used as a shared protective conductor (PE) and/or as a shared neutral conductor of the busbar system. Therefore none of the first busbars 101, 102, 103, 104 has to be configured as a shared protective conductor (PE) and/or as a shared neutral conductor. It is likewise possible for one of the busbars from the first busbars 101, 102, 103, 104, e.g. busbar 101, to be configured as a shared protective conductor (PE) and/or as a shared neutral conductor of busbar system. Likewise, the shared protective conductor (PE) and/or the shared neutral conductor may take the form of an individual busbar which is provided in addition to a plurality of first or second busbars.

According to FIG. 2B, the retaining unit 500 comprises a second bolt-type connection 520. The second busbars 201, 202, 203, 204, 205, 206, 207 of the first segment 701 are electrically connected to the second busbars 201', 202', 203', 204', 205', 206', 207' of the second segment 702 by way of said second bolt-type connection 520, in that the ends of the second busbars lie flat against each other and a second bolt-type connection 520 exerts a force which presses the ends of the second busbars together, said ends lying flat against each other.

According to the example embodiment illustrated here, the retaining units 500, 501 include the connections 510, 520. However, it is equally conceivable for the connections 510, 520 which electrically interconnect the respective busbars of the segments 701, 702 to be separate from the retaining units 500, 501. Consequently, the retaining units 500, 501 could be physically arranged at the centers of the busbars while the connections 510, 520 are situated at the ends of the busbars.

Figure 3:
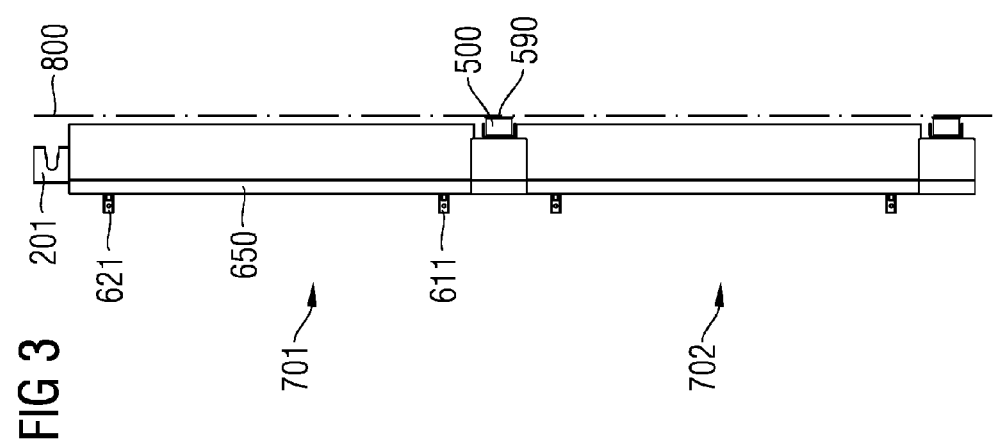
FIG. 3 shows a busbar system comprising a first and a second segment illustrated in a third projection.

FIG. 3 illustrates the busbar system according to an embodiment of the invention in a third projection. The illustration is a lateral view of the busbar system according to FIG. 1A rotated by an angle of 90°. The busbar system comprises the first segment 701 and the second segment 702. The busbars of the segments are electrically interconnected via the connection 510, 520 of the retaining unit 500. The retaining unit 500 comprises a retaining device 590 for fastening the busbar system. For example, the busbar system can be screwed to a wall 800 via the retaining device 590. The busbar system comprises retainers 610, 620 with arms 611, 621 onto which a cover 650 can be pushed and then fixed.

The cover 650 may be so designed as to attach only to those sides of the segments 701, 702 which face away from the fastening of the busbar system. According to FIG. 3, this means that the cover is not situated on the underside, which faces the wall 800, but runs only along the sides of the busbars and above the busbars parallel with the wall 800. According to FIG. 1B, this means that the cover 650 includes three segments, specifically the segments 653 and 651 running approximately parallel with the busbars 100, 200 and the segment 652 running approximately parallel with a wall 800.

The first busbars 100 and second busbars 200 of the respective segments 701, 702 can likewise be interconnected via a single bolt-type connection.

Figure 4:
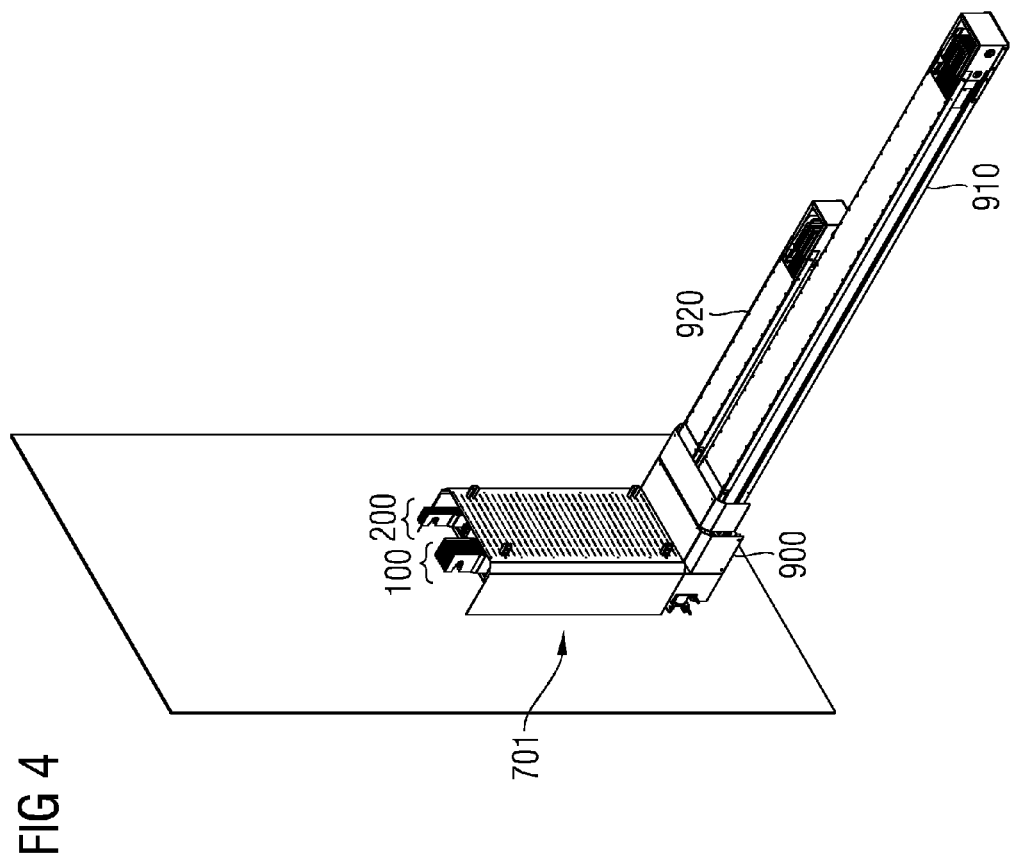
FIG. 4 shows an adapter for a busbar system.

FIG. 4 illustrates an adapter 900, which connects the busbar system according to an embodiment of the invention to conventional busbar systems. The busbar system according to an embodiment of the invention comprises first busbars 100 and second busbars 200, both of which are electrically connected to the adapter 900. Bolt-type connections can again be used as a connection. The adapter 900 likewise also has connection interfaces for a first external busbar system 910. The first external busbar system 910 has the same number of busbars as the number of first busbars of the busbar system according to an embodiment of the invention, said busbars having the same cross-sectional areas. The adapter 900 likewise connects the second busbars of the busbar system according to an embodiment of the invention to a second external busbar system 920. The second external busbar system 920 is a busbar system which has the same number of busbars as the number of second busbars of the busbar system according to an embodiment of the invention. The cross-sectional areas of the second busbars of the busbar system according to an embodiment of the invention are likewise identical to those of the busbars of the second external busbar system.

The adapter 900 can be so designed as to allow a right-angled connection interface between the busbar system according to an embodiment of the invention and the first and second external busbar systems.

The adapter 900 can be so designed as to connect the busbar which is used as a shared protective conductor (PE) and/or as a shared neutral conductor to the protective conductor (PE) and/or the neutral conductor of the first external busbar system 910 and to the protective conductor (PE) and/or the neutral conductor of the second external busbar system 920.

The cover 650 and the busbars are no longer considered as unitary but as separate elements in the busbar system according to an embodiment of the invention, thereby providing inter alia advantages as follows. The size of the busbars can be adapted as required, since their dimensioning is not limited by a system housing. Likewise, the number of busbars and the cross-sectional area of the busbars are variable and can be selected to suit the individual application. For example, a housing may contain a busbar system comprising four first busbars and seven second busbars. By increasing the clearances of busbars from the cover, it is possible to generate a better thermal lift in the cover (chimney effect). By virtue of this effect, the heat dissipation improves and the current carrying capacity of the busbars is increased. An additional cost benefit is achieved by combining a plurality of busbars having different cross-sectional areas under one cover.

The use of a busbar from either the first busbars of the second busbars as a shared protective conductor (PE) and/or as a shared neutral conductor allows the production of busbar systems with reduced weight and less material, and costing less than conventional busbar systems.

The invention claimed is:
1. A busbar system for transporting electrical energy, the busbar system comprising:
at least one first segment; and
one second segment, wherein the first and second segments each respectively comprise at least one first busbar including a first cross-sectional area, at least one second busbar including a second cross-sectional area, a retaining unit and at least one connection, wherein the first and second busbars of the first and second segments are retained by the respective retaining units and are electrically interconnected via the at least one connection, wherein
a busbar from either the first busbars or the second busbars is used as at least one of a shared protective conductor and a shared neutral conductor.

2. The busbar system of claim 1, wherein the busbars of the segments are so designed as to extend in the direction of the current flow.

3. The busbar system of claim 1, wherein the segments comprise at least one of a plurality of first busbars and a plurality of second busbars arranged so as to be parallel with each other in the respective segment.

4. The busbar system of claim 1, wherein the retaining units comprise a first bolt-type connection, and wherein the first busbars of the respective segments are electrically interconnected such that the ends of the first busbars, lie flat against each other and the first bolt-type connection exerts a force which presses the ends of the first busbars together, said ends lying flat against each other.

5. The busbar system of claim 1, wherein the retaining units comprise a second bolt-type connection, and wherein the second busbars of the respective segments are electrically interconnected such that the ends of the second busbars lie flat against each other and the second bolt-type connection exerts a force which presses the ends of the second busbars together, said ends lying flat against each other.

6. The busbar system of claim 1, wherein the retaining units of the segments are used as at least one retaining device for fastening the busbar system.

7. The busbar system of claim 1, wherein the first cross-sectional area of the first busbars differs from the second cross-sectional area of the second busbars.

8. The busbar system of claim 7, wherein the first cross-sectional area of the first busbars differs from the second cross-sectional area of the second busbars because the height of the first busbars differs from the height of the second busbars.

9. The busbar system of claim 1, wherein the first busbars and the second busbars run parallel with each other.

10. The busbar system of claim 1, wherein the first busbars and the second busbars of the respective segments are respectively interconnected via a single bolt-type connection.

11. The busbar system of claim 1, wherein retainers are attached to the busbars of the respective segments and a cover is fastened to said retainers.

12. The busbar system of claim 11, wherein the cover is only attached to those sides of the segments which face away from the fastening of the busbar system.

13. The busbar system one of claim 1, further comprising first busbars and second busbars, wherein the busbar system also comprises an adapter to connect the first busbars to a first external busbar system and the second busbars to a second external busbar system.

14. The busbar system of claim 13, wherein the adapter is configured to connects the busbar which is used as at least one of a shared protective conductor and a shared neutral conductor to at least one of the protective conductor and the neutral conductor of the first external busbar system and to at least one of the protective conductor and the neutral conductor of the second external busbar system.

15. The busbar system in of claim 13, wherein the adapter is so designed to provide a right-angled connection between the first and second busbars on one side, these running parallel with each other, and the busbars of the first and second external busbar systems on the other side.

16. The busbar system of claim 14, wherein the adapter is so designed to provide a right-angled connection between the first and second busbars on one side, these running parallel with each other, and the busbars of the first and second external busbar systems on the other side.

17. The busbar system of claim 2, wherein the segments comprise at least one of a plurality of first busbars and a plurality of second busbars arranged so as to be parallel with each other in the respective segment.

18. The busbar system of claim 2, wherein the retaining units comprise a first bolt-type connection, and wherein the first busbars of the respective segments are electrically interconnected such that the ends of the first busbars lie flat against each other and the first bolt-type connection exerts a force which presses the ends of the first busbars together, said ends lying flat against each other.

19. The busbar system of claim 2, wherein the retaining units comprise a second bolt-type connection, and wherein the second busbars of the respective segments are electrically interconnected such that the ends of the second busbars lie flat against each other and the second bolt-type connection exerts a force which presses the ends of the second busbars together, said ends lying flat against each other.

* * * * *